United States Patent [19]

Gryctko

[11] 3,908,154

[45] Sept. 23, 1975

[54] TWO POLE GROUND FAULT CIRCUIT PROTECTOR

[75] Inventor: Carl E. Gryctko, Haddon Heights, N.J.

[73] Assignee: I-T-E Imperial Corporation, Spring House, Pa.

[22] Filed: Sept. 13, 1974

[21] Appl. No.: 505,682

[52] U.S. Cl. ............... 317/18 R; 317/18 D; 317/58; 317/112
[51] Int. Cl.² .. H01H 83/02; H01H 83/22; H02H 3/32; H02H 7/22
[58] Field of Search .......... 317/18 D, 18 R, 58, 112

[56] References Cited
UNITED STATES PATENTS

| | | | |
|---|---|---|---|
| 3,256,407 | 6/1966 | Klein | 317/58 |
| 3,636,482 | 1/1972 | Edmunds | 317/112 |
| 3,745,414 | 7/1973 | Frantti et al. | 317/58 |
| 3,745,415 | 7/1973 | Polley et al. | 317/18 D |
| 3,812,400 | 5/1974 | Gryctko et al. | 317/18 R |
| 3,869,649 | 3/1975 | Hobson, Jr. | 317/18 D |

*Primary Examiner*—L. T. Hix
*Attorney, Agent, or Firm*—Ostrolenk, Faber, Gerb & Soffen

[57] ABSTRACT

A two pole ground fault protector is constructed of a detector-control module sandwiched between a pair of circuit breaker modules having their manual operating handles tied together. The combined width of the pair of circuit breakers equals the width of the detector module. The latter is provided with both line terminals for the protector and these terminals are spaced by the width of the detector module which is the same as the spacing between panelboard line terminal stabs. Load terminals of the circuit breaker modules constitute the load terminals for the protector. A tie bar connecting the automatic tripping mechanisms of the circuit breaker modules together and extending through the detector module is actuated by an electromagnet in the detector module to simultaneously open both circuit breaker modules upon the occurrence of a ground fault.

13 Claims, 8 Drawing Figures

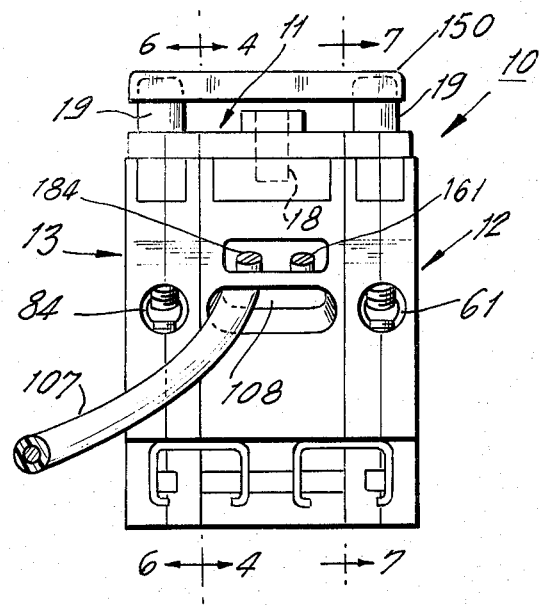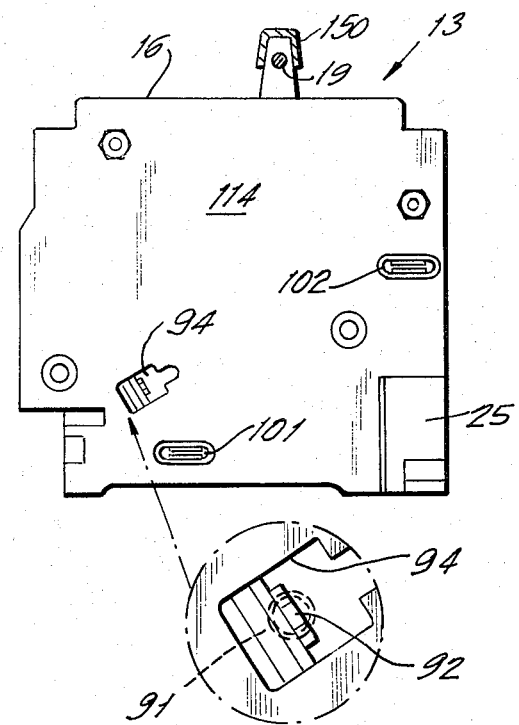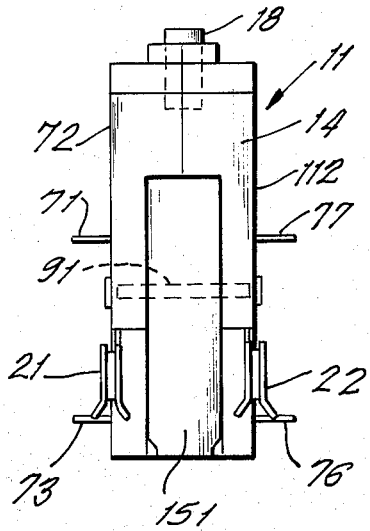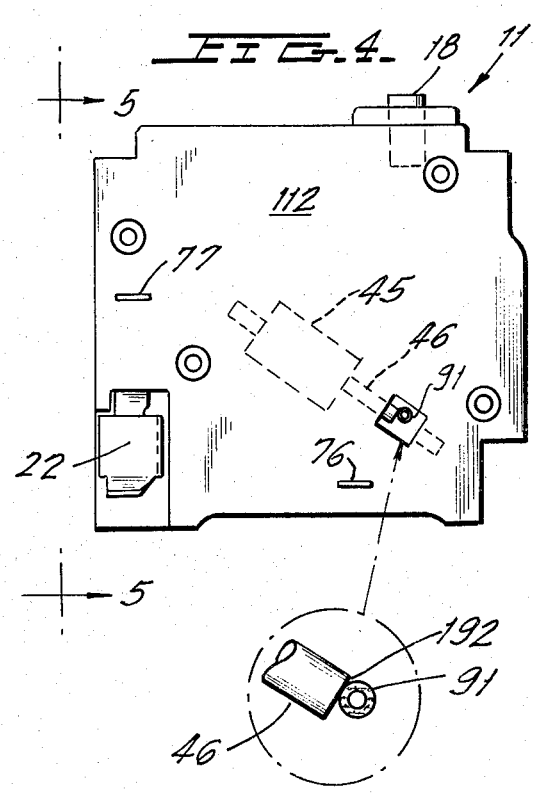

TWO POLE GROUND FAULT CIRCUIT PROTECTOR

This invention relates to circuit protective equipment in general and relates more particularly to a two pole ground fault interrupter.

For residential applications it is common to utilize single phase three wire systems in which there is a grounded neutral and two hot conductors, each of a different polarity with respect to the neutral. Panelboards for this type of electric service are often constructed with a row of line terminals, alternate ones of which are connected to one hot conductor and the remaining ones connected to the other hot conductor. Spacings between adjacent line terminals are usually uniform, and a circuit breaker for this type of panelboard is usually constructed so that the width thereof is substantially equal to or half the spacing between adjacent panelboard line terminals.

When it is desired to provide a two pole circuit breaker for this type of panelboard, it is usually constructed of two single pole modules stacked side-by-side. In accordance with the instant invention, ground fault protection is added to the overload current protection provided by a two pole circuit breaker.

More particularly, in accordance with the instant invention, a two pole ground fault circuit protector is constructed of two single pole circuit breaker modules and a ground fault module which is sandwiched between the circuit breaker module and is as wide as the combined width of the circuit breaker modules. Both line terminals for the ground fault circuit protector are parts of the detector module and are spaced apart the same distance as the spacing between adjacent line terminals of the panelboard. A ground fault on either of the hot conductors will actuate the detector module so that an electromagnet therein will be energized to automatically trip both circuit breakers simultaneously. In addition, an overcurrent fault condition in either circuit breaker will cause tripping of both circuit breakers.

Accordingly, a primary object of the instant invention is to provide a novel construction for a two-pole ground fault circuit protector.

Another object is to provide a ground fault circuit protector of this type including a detector module that is substantially twice the width either circuit breaker module and is sandwiched therebetween.

Still another object is to provide this type of detector module with all of the line terminals for the ground fault circuit protector.

A further object is to provide a ground fault circuit protector of this type having plug-in connectors to facilitate assembly of the module.

Another object is to provide a ground fault protector in which essentially identical circuit breaker modules are electrically connected to a detector module by plug-in connectors.

These objects as well as other objects of this invention will become readily apparent after reading the following description of the accompanying drawings in which:

FIG. 3 is an end view of the protector looking in the direction of arrows 3—3 of FIG. 1.

FIG. 4 is a side elevation of the detector-control module looking in the direction of arrows 4—4 of FIG. 3.

FIG. 5 is an end view of the detector-control module looking in the direction of arrows 5—5 of FIG. 4.

FIG. 6 is a side elevation of one of the circuit breaker modules, looking in the direction of arrows 6—6 of FIG. 3.

Figure 1:
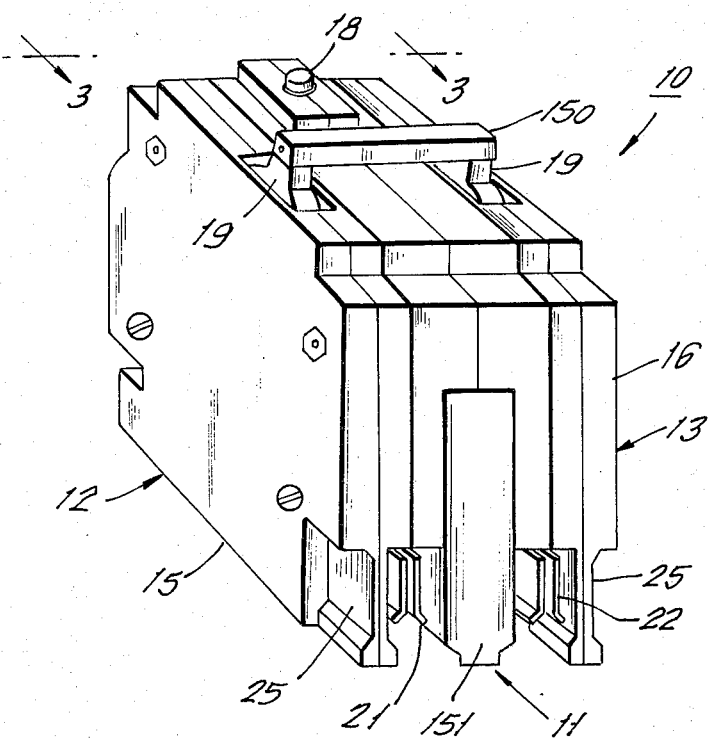
FIG. 1 is a perspective looking at the line end of a ground fault circuit protector constructed in accordance with teachings of the instant invention.

Now referring to the drawings. Ground fault circuit protector 10 of FIGS. 1 and 3 is constructed of detector-control module 11 sandwiched between and connected to single pole circuit breaker module 12, 13. Detector-control module 11 includes molded insulating housing 14 of a width that is substantially equal to the combined widths of housings 15, 16 of the respective circuit breaker modules 12, 13. A manual operating handle 19 extends from the forward end of each circuit breaker 12, 13. Tie member 150 provides a mechanical connection between handles 19, 19 for simultaneous manual operation of circuit breakers 12, 13. Depressible button 18 is provided at the forward edge of detector module 11 for operation of a test switch (not shown).

Female plug-in type line terminals 21, 22, separated by insulating barrier 151, are disposed along opposite sides of detector module 11 at a rear corner thereof, so as to be engageable with adjacent male line terminal stabs 23, 24, respectively, of a panelboard (not shown). Circuit breaker housings 15, 16 are each provided with a formation 25 adjacent stabs 21, 22 to provide insulating barriers between stabs 21, 22 and panelboard stabs positioned adjacent thereto. The spacing between centers of terminals 21, 22 is essentially equal to the width of housing 14.

Figure 2:
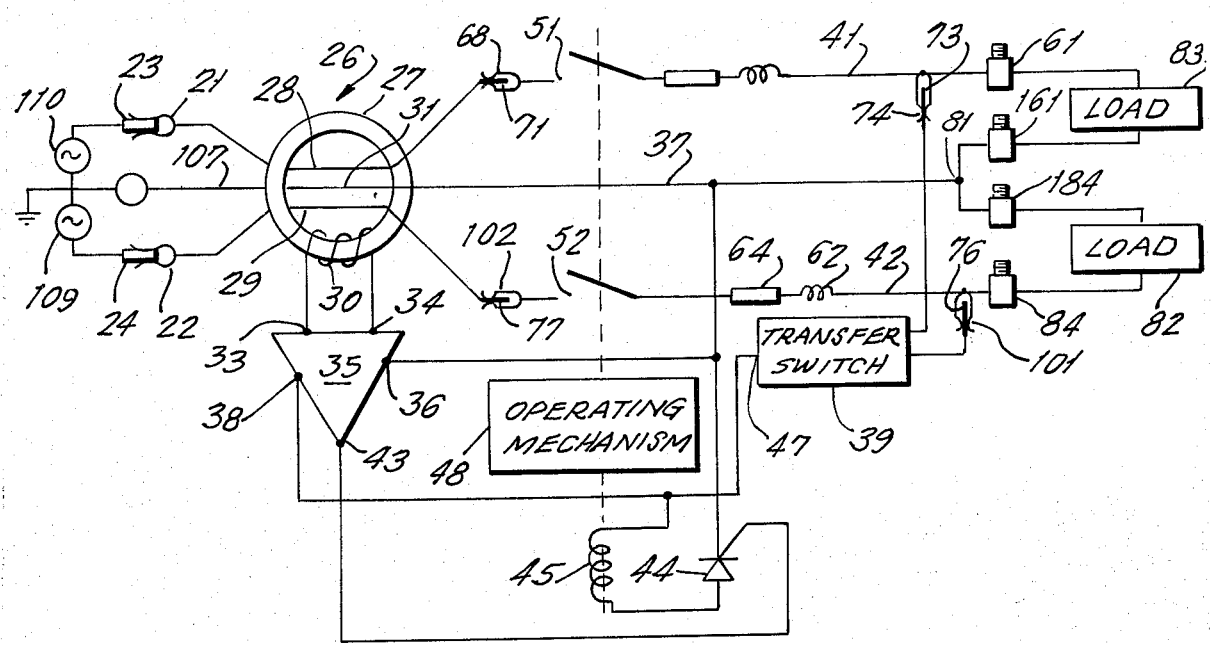
FIG. 2 is an electrical schematic showing the protector of FIG. 1 connected in circuit between an electric power source and an electrical load.

Within housing 14 is balanced transformer 26 (FIG. 2) including torroidal core 27 through which single turn hot primary windings 28, 29 and neutral primary windings 31 extend. Transformer 26 also includes multi-turn secondary winding 30 connected to input terminals 33, 34 of operational amplifier 35. The latter also includes energizing terminal 36 connected directly to neutral conductor 37 that runs through housing 11. The other energizing terminal 38 for amplifier 35 is connected through transfer switch 39 which automatically switches connections between hot conductors 41 and 42. The operation of transfer switch 39 is explained in detail in the copending application [C1708(DM)] Ser. No. 501,192, filed Aug. 27, 1974, by W. R. Clark entitled Grounded Neutral Detector Drive Circuit For Two Pole Ground Fault Interrupter, and assigned to the assignee of the instant invention.

Amplifier output terminal 43 is connected to the switching input of solid-state switch 44 connected in series combination with the coil of electromagnetic trip 45 which, when energized, operates plunger 46 along its longitudinal axis generally to the right with respect to FIG. 4. The series combination of solid-state switch 44 and trip coil 45 is connected between neutral 37 and output 47 of transfer switch 39. In a manner known to the art, when normally cut off switch 44 is driven into conduction by the appearance of an appropriate switching signal at output 43 of amplifier 35, trip coil 45 will be energized thereby actuating the operating mechanisms 48 in both of the circuit breaker modules 12, 13, so as to open the respective contacts 51, 52 thereof.

Figure 7:
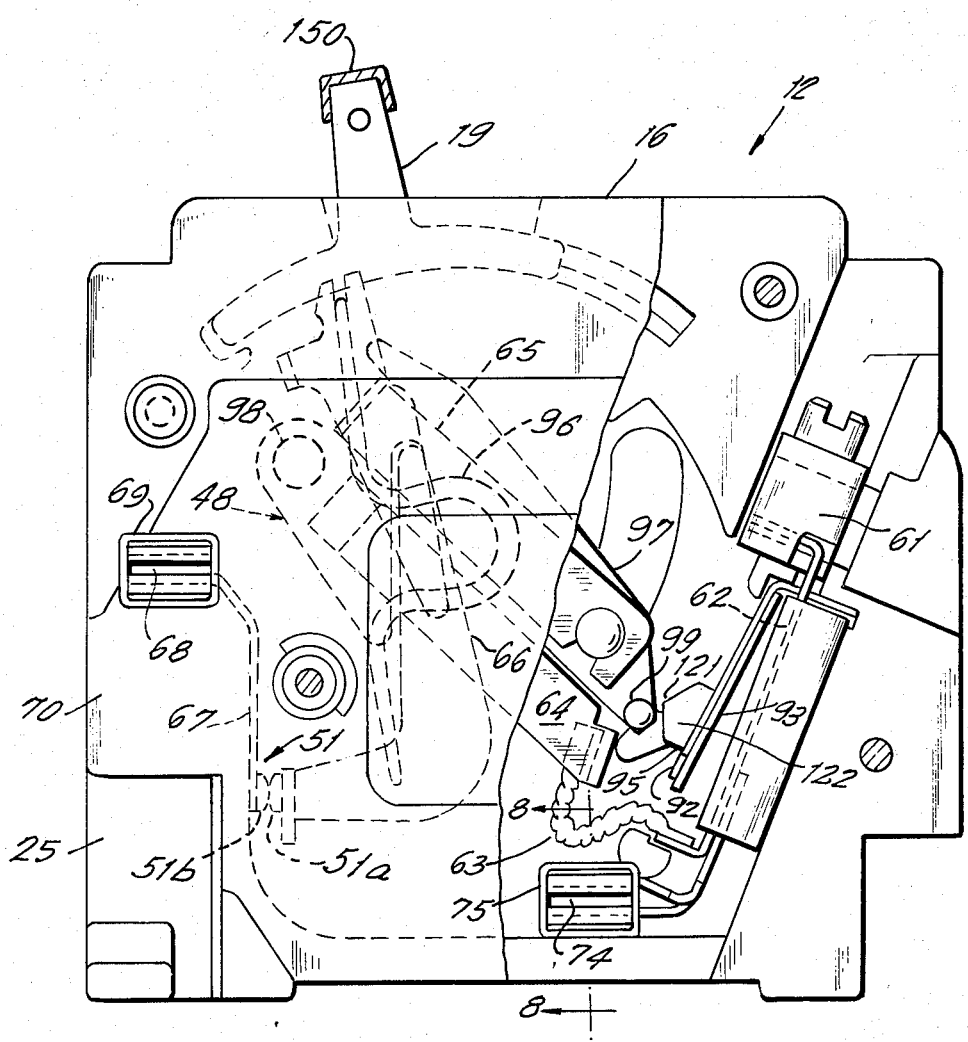
FIG. 7 is a side elevation of one of the circuit breaker modules, looking in the direction of arrows 7—7 of FIG. 3, with the cover removed to reveal the electrical and operating elements.
Figure 8:
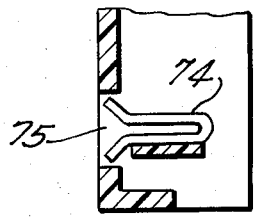
FIG. 8 is a cross-section taken through line 8—8 of FIG. 7 looking in the direction of arrows 8—8.

As seen in FIG. 7, the current path through circuit breaker module 12 consists of load terminal 61, instantaneous trip means single turn winding 62, flexible conductor 63, bimetal 64, spring conductor 65, movable contact arm 66, movable contact 51a, stationary contact 51b, strap 67, and female plug-in contact 68 aligned with rectangular aperture 69 in sidewall 70 of housing 16. Female terminal 68 is engaged with male terminal 71 projecting through sidewall 72 of detector module housing 14. A similar male contact 73 also projects from sidewall 72 and engages female terminal 74 aligned with rectangular opening 75 in side 70 of circuit breaker module 12 to energize one of the inputs for transfer switch 39. The other input of transfer switch 39 is similarly energized from hot conductor 42 by engaged male and female plug-in contacts 76, 101 of modules 11 and 13, respectively. The engagement between male and female plug-in stabs 77, 102 of modules 11 and 13, respectively, connects contacts 52 in series with hot primary winding 28 of differential transformer 26. Male stabs 76, 77 project from sidewall 112 of module 11.

Circuit breaker modules 12, 13 are essentially of the same construction, the only significant differences being the alignment of contacts and apertures for electrical and mechanical connections to module 11.

The line end 107 of neutral primary 31 extends through aperture 108 at the load end of module 11, and is connected to the grounded point of a.c. source 109, 110. Load end 37 of neutral primary 31 is connected to common point 81 of load neutral terminals 161, 184 of module 11. One end of load 82 is connected to terminal 184, and one end of load 83 is connected to terminal 161. The other end of load 82 is connected to the load terminal 84 of circuit breaker module 13, and the other end of load 83 is connected to load terminal 61 of circuit breaker module 12.

In the event a ground fault appears on either of the hot lines, the net sum of the currents flowing through primary windings 28, 29, 31 will not cancel one another, so that there will be a net flux generated in core 27 to produce an error signal in secondary winding 30. This error signal appears at output 43 of amplifier 35 to drive switch 44 into conduction and energize trip coil 45. Upon energization of the latter, plunger 46 is driven to the right with respect to FIG. 4, with plunger end 192 engaging insulating tube 91 at its center to drive it transversely to the right with respect to FIG. 4. Each end of tube 91 engages an extension 92 which projects sideways from instantaneous trip armature 93 and through aperture 94 in circuit breaker module sidewalls 70, 114. Thus, when tube 91 moves transversely to the right with respect to FIG. 4, latches 95 of both circuit breakers 12, 13 are released and operating mechanisms 48 powered by springs 96 act to open the sets of cooperating contacts 51, 52.

In the event there is an overcurrent fault in one of the circuit breakers 12, 13, automatic tripping thereof will cause cradle 97 in the fault current carrying breaker to pivot counterclockwise with respect to FIG. 7 about formation 98 so that pin 99 carried by cradle 97 moves upward, and in so doing engages cam surface 121 on projection 122 secured to armature 93. The engagement between pin 99 and surface 121 moves armature 93 to the right with respect to FIG. 7, thereby moving projection 92 to the right with respect to FIG. 7 carrying with it insulating tube 91, which, acting as a tie bar, moves projection 92 of the circuit breaker module which is not carrying fault current causing this circuit breaker module to open.

Thus, it is seen that all fault conditions, regardless of the character thereof and even if occurring only in one pole, will cause opening of both poles of circuit protector 10.

Although there have been described preferred embodiments of this novel invention, many variations and modifications will now be apparent to those skilled in the art. Therefore this invention is to be limited not by the specific disclosure herein but only by the appending claims.

The embodiments of the invention in which an exclusive privilege or property is claimed are defined as follows:

1. A ground fault circuit protector including first and second switch modules having respective first and second housings, and a detector control module having a third housing sandwiched between the first and second housings; each of said switch modules including separable cooperating contacts and a load terminal in circuit with said contacts; said detector-control module including first and second line terminals, a balanced transformer including first and second primary windings connected in circuit with the respective first and second line terminals, conductor means extending through the sides of the third housing and the sides of the first and second housings to connect the first primary winding in series with the contacts of said first module and to connect the second primary winding in series with the contacts of the second module.

2. A ground fault circuit protector as set forth in claim 1 in which the width of the third housing is approximately twice the width of the second housing which is approximately the width of the first housing; said line terminals being located on centers spaced by approximately the width of the third housing.

3. A ground fault circuit protector as set forth in claim 1 in which the transformer also includes a secondary winding wherein error signals are generated responsive to unbalanced currents in the primary windings; said detector-control module also including amplifier means and actuator means controlled by said amplifier means responsive to said error signals; additional conductor means extending through the sides of the third housing and the sides of the other housings to connect the amplifier to the load terminals of the first and second switch modules.

4. A ground fault circuit protector as set forth in claim 3 in which the conductor means and the additional conductor means each includes plug-in type contacts at the sidewall boundaries between the third housing and the other housings.

5. A ground fault circuit protector as set forth in claim 4 in which the width of the third housing is approximately twice the width of the second housing which is approximately the width of the first housing; said line terminals being located on centers spaced by approximately the width of the third housing.

6. A ground fault circuit protector as set forth in claim 4 in which the additional conductor means is connected to each of said switch modules on the load terminal side of the cooperating contacts.

7. A ground fault circuit protector as set forth in claim 6 in which, for each of the switch modules, the cooperating contacts are connected in series circuit between the load terminal and one of the line terminals.

8. A ground fault circuit protector as set forth in claim 7; said third housing being substantially as wide as the combined widths of the other housings; said line terminals being positioned on centers spaced by approximately the width of the third housing.

9. A ground fault circuit protector as set forth in claim 1 in which the load terminals are accessible at one end of the protector for the making of external circuit connections to the protector, and the line terminals are at the other end of the protector.

10. A ground fault circuit protector as set forth in claim 9 in which the width of the third housing is approximately twice the width of the second housing which is approximately the width of the first housing; said line terminals being positioned on centers spaced by approximately the width of the third housing.

11. A ground fault protector as set forth in claim 3 in which each of the switch modules includes trip means for automatically opening the contacts upon the occurrence of predetermined overload conditions; a tie element extending transversely through said third housing into said first and second housings, said tie element being operatively positioned to be moved by said actuator means upon operation of the latter and when so moved operating said trip means in both of said switch modules to open the contacts thereof.

12. A ground fault circuit protector as set forth in claim 11 in which the conductor means and the additional conductor means each includes plug-in type contacts at the sidewall boundaries between the third housing and the other housings.

13. A ground fault protector as set forth in claim 12 in which operative engagement between the tie element and the trip means is achieved by plug-in type connections at opposite ends of the tie element.

* * * * *